US012686785B2

(12) United States Patent
Kasperchik et al.

(10) Patent No.: US 12,686,785 B2
(45) Date of Patent: Jul. 21, 2026

(54) THREE-DIMENSIONAL PRINTING WITH WETTING AGENT

(71) Applicant: PERIDOT PRINT LLC, Palo Alto, CA (US)

(72) Inventors: Vladek Kasperchik, Corvallis, OR (US); Jennifer Wu, Corvallis, OR (US); Ian Pahk, Corvallis, OR (US)

(73) Assignee: Peridot Print LLC, Palo Alto, CA (US)

( * ) Notice: Subject to any disclaimer, the term of this patent is extended or adjusted under 35 U.S.C. 154(b) by 760 days.

(21) Appl. No.: 18/009,939

(22) PCT Filed: Jul. 20, 2020

(86) PCT No.: PCT/US2020/042789
§ 371 (c)(1),
(2) Date: Dec. 12, 2022

(87) PCT Pub. No.: WO2022/019882
PCT Pub. Date: Jan. 27, 2022

(65) Prior Publication Data
US 2023/0265310 A1     Aug. 24, 2023

(51) Int. Cl.
*C09D 133/08* (2006.01)

(52) U.S. Cl.
CPC .................................. *C09D 133/08* (2013.01)

(58) Field of Classification Search
CPC ..... C09D 133/08; B22F 2998/10; B22F 10/14
See application file for complete search history.

(56) References Cited

U.S. PATENT DOCUMENTS

| | | | |
|---|---|---|---|
| 10,486,363 | B2 | 11/2019 | Sachs et al. |
| 2017/0297106 | A1 | 10/2017 | Myerberg et al. |
| 2017/0349770 | A1 | 12/2017 | Jung et al. |
| 2019/0047047 | A1 | 2/2019 | Mark |
| 2019/0299520 | A1 | 10/2019 | Wieber et al. |
| 2020/0206812 | A1* | 7/2020 | Aotani ...................... B22F 3/00 |

FOREIGN PATENT DOCUMENTS

| | | |
|---|---|---|
| WO | 2017/180314 A1 | 10/2017 |
| WO | 2020/023041 A1 | 1/2020 |

OTHER PUBLICATIONS

The difference between propylene glycol and ethylene glycol (Year: 2018).*
Ethylene Glycol product sheets (Year: 2025).*
Hexylene Glycol product sheets (Year: 2025).*

* cited by examiner

*Primary Examiner* — Catherine S Branch
*Assistant Examiner* — Huihong Qiao
(74) *Attorney, Agent, or Firm* — Dierker & Kavanaugh, P.C.

(57) ABSTRACT

A multi-fluid kit for three-dimensional printing can include a wetting agent and a binding agent. The wetting agent can include from about 5 wt % to about 80 wt % water-miscible hydroxyl-containing solvent and from about 20 wt % to about 95 wt % water. The water-miscible hydroxyl-containing solvent can be selected from methyl lactate, ethyl lactate, propyl lactate, 2-methyl 2,4-pentanediol, 1,2 hexanediol, 1,2 pentanediol, or a mixture thereof. The binding agent can include from about 2 wt % to about 30 wt % polymer binder dispersed in an aqueous liquid vehicle.

19 Claims, 2 Drawing Sheets

10

500 iteratively applying individual build material layers of a particulate build material onto a powder bed, the particulate build material including from about 80 wt% to 100 wt% metal particles — 510 based on a three-dimensional object model, iteratively applying a wetting agent to individual build material layers, wherein the wetting agent includes from about 10 wt% to about 80 wt% water-miscible hydroxyl-containing solvent selected from methyl lactate, ethyl lactate, propyl lactate, 2-methyl 2,4-pentandiol, 1,2 hexanediol, 1,2 pentanediol, or a mixture thereof, and further including and from about 20 wt% to about 90 wt% water — 520 based on a three-dimensional object model, iteratively and selectively applying a binding agent to individual build material layers at a location where the wetting agent was applied to define individually patterned object layers that become adhered to one another to form a layered green body object, wherein the binding agent includes from about 2 wt% to about 30 wt% polymer binder and an aqueous liquid vehicle — 530

FIG. 3

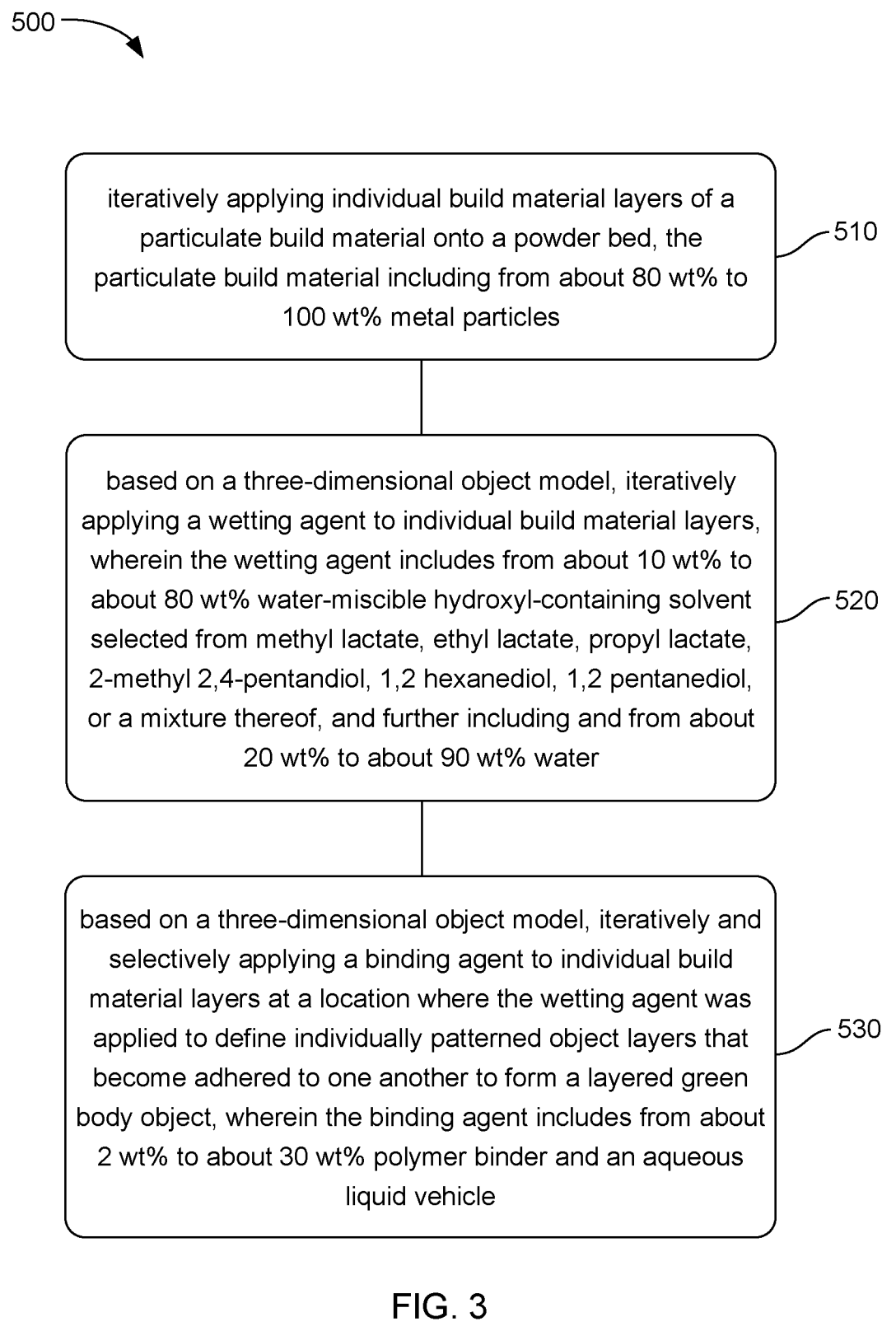

THREE-DIMENSIONAL PRINTING WITH WETTING AGENT

BACKGROUND

Three-dimensional (3D) printing may be an additive printing process used to make 3D solid parts from a digital model. 3D printing is often used in rapid product prototyping, mold generation, mold master generation, and short run manufacturing. Some 3D printing techniques are considered additive processes because they involve the application of successive layers of material. This is unlike other machining processes, which often rely upon the removal of material to create the final part. Some 3D printing methods use chemical binders or adhesives to bind build materials together. Other 3D printing methods involve the use of polymeric build material, and still others involve additive manufacturing using metal which can be heat fused, such as by sintering, melting, etc., the build material. For some materials, sintering may be carried out by a partial sintering process, and others may occur using heat-assisted extrusion, curing via ultra-violet light or infrared light, or by other processes.

BRIEF DESCRIPTION OF THE DRAWINGS

FIG. 3 is a flow diagram illustrating an example method of 3D printing in accordance with the present disclosure.

DETAILED DESCRIPTION

Figure 1:
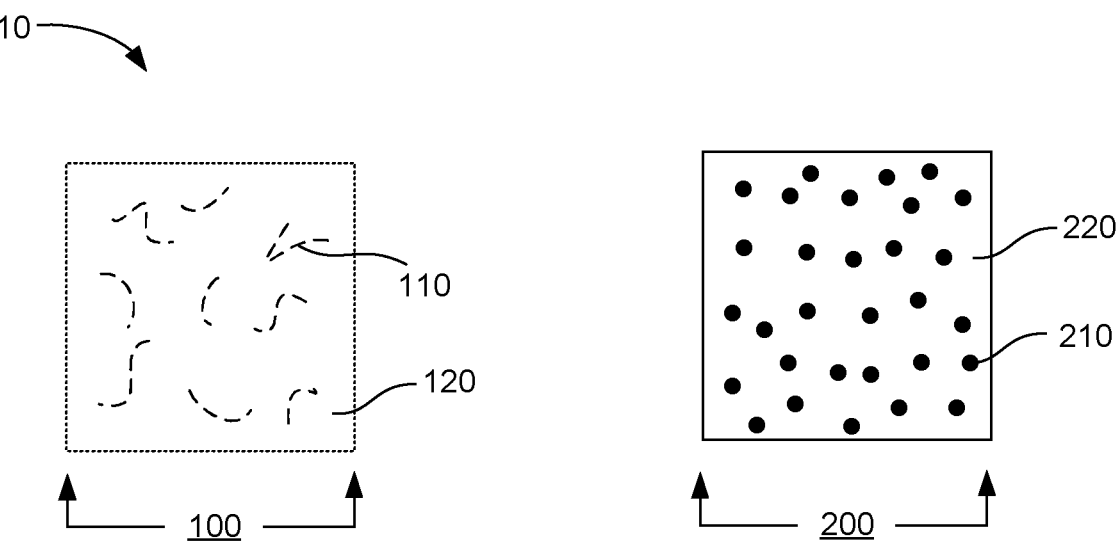
FIG. 1 graphically illustrates an example multi-fluid kit in accordance with the present disclosure.

Three-dimensional (3D) printing can be an additive process that can involve the application of successive layers of particulate build material with chemical binders or adhesives printed thereon to bind the successive layers of the particulate build materials together. In some processes, application of a binding agent with a binder therein can be utilized to form a green body object and then a fused three-dimensional physical object can be formed therefrom. More specifically, a binding agent can be selectively applied to a layer of a particulate build material on a support bed to pattern a selected region of the layer of the particulate build material and then another layer of the particulate build material can be applied thereon. The binding agent can be applied to another layer of the particulate build material and these processes can be repeated to form a green part (also known as a three-dimensional green body or object) which can then be heat fused, such as by sintering, to form a fused three-dimensional object.

However, in some three-dimensional printing examples, a binding agent can impact a layer of the particulate build material with a velocity and force that can disrupt the layer of the particulate build material. Droplets of the binding agent can create structural defects, such as craters, by ejecting loose particles and/or irregular agglomeration of particles. In addition, binding agents can exhibit delayed infiltration of the particulate build material. These printing interactions can result in surface roughness on a printed object and can create cavities in a green body object that can be formed. Cavities in a green body object can inversely relate to density in a fused three-dimensional object. Green body objects with more cavities (either in quantity or volume) can be less dense than green body objects with fewer cavities. An increase in a cavity space of a green body object can decrease a density of the fused three-dimensional object, leaving the three-dimensional object subjectable to fatigue and/or cracking.

In accordance with this, a multi-fluid kit can include a wetting agent and a binding agent. The wetting agent can include from about 5 wt % to about 80 wt % water-miscible hydroxyl-containing solvent selected from methyl lactate, ethyl lactate, propyl lactate, 2-methyl 2,4-pentanediol, 1,2 hexanediol, 1,2 pentanediol, or a mixture thereof; and from about 20 wt % to about 95 wt % water. The binding agent can include from about 2 wt % to about 30 wt % of a polymer binder and an aqueous liquid vehicle. In some examples, the wetting agent can include from about 20 wt % to about 60 wt % water-miscible hydroxyl-containing solvent. In another example, the water-miscible hydroxyl-containing solvent can be ethyl lactate, 2-methyl 2,4-pentanediol, or a mixture thereof. In a further example, the polymer binder can include latex polymer particles that can have an average particle size from about 3 nm to about 1 μm.

In another example, a three-dimensional printing kit can include a wetting agent, a binding agent, and a particulate build material. The wetting agent can include from about 5 wt % to about 80 wt % water-miscible hydroxyl-containing solvent selected from methyl lactate, ethyl lactate, propyl lactate, 2-methyl 2,4-pentanediol, 1,2 hexanediol, 1,2 pentanediol, or a mixture thereof; and from about 20 wt % to about 95 wt % water. The binding agent can include from about 2 wt % to about 30 wt % polymer binder and an aqueous liquid vehicle. The particulate build material can include from about 80 wt % to 100 wt % metal particles. In one example, the wetting agent can include from about 20 wt % to about 60 wt % of the water-miscible hydroxyl-containing solvent. The water-miscible hydroxyl-containing solvent can include ethyl lactate, 2-methyl 2,4-pentanediol, or a mixture thereof. In a further example, the particulate build material can include from about 95 wt % to 100 wt % of the metal particles and the metal particles can have a D50 particle size from about 3 μm to about 100 μm.

In another example, a method of three-dimensional printing can include iteratively applying individual build material layers of a particulate build material onto a powder bed. The particulate build material can include from about 80 wt % to 100 wt % metal particles. The method can further include, based on a three-dimensional object model, iteratively and selectively applying a wetting agent to individual build material layers. The wetting agent can include from about 5 wt % to about 80 wt % water-miscible hydroxyl-containing solvent selected from methyl lactate, ethyl lactate, propyl lactate, 2-methyl 2,4-pentanediol, 1,2 hexanediol, 1,2 pentanediol, or a mixture thereof; and from about 20 wt % to about 95 wt % water. The method can further include based on a three-dimensional object model, iteratively and selectively applying a binding agent to individual build material layers to define individually patterned object layers that can become adhered to one another to form a layered green body object. The binding agent can include from about 2 wt % to about 30 wt % of a polymer binder dispersed in an aqueous liquid vehicle. In one example, the wetting agent includes from about 20 wt % to about 60 wt % of the water-miscible hydroxyl-containing solvent, and the water-miscible hydroxyl-containing solvent includes ethyl lactate, 2-methyl 2,4-pentanediol, or a mixture thereof. In another example, the method can further include heating the layered green body object to a temperature ranging from about 100° C. to about 200° C. to cure the layered green body object. In another example, the wetting agent and the binding agent can be applied at the location at a weight ratio from about 1:5 to about 5:1. In another example, the wetting agent and the binding agent can be collectively applied at the location at a total fluid agent to particulate build material weight ratio from about 3:97 to about 10:90. In yet another example, the method can further include heating the particulate build material to a temperature ranging from about 40° C. to about 100° C. for applying the wetting agent and the binding to the individual layers. In a further example, the method can further include sintering the layered green body object to form a heat-fused metal article.

When discussing the multi-fluid kit, the three-dimensional printing kit, and/or the method of three-dimensional printing herein, these discussions can be considered applicable to one another whether or not they are explicitly discussed in the context of that example. Thus, for example, when discussing a wetting agent related to a multi-fluid kit, such disclosure is also relevant to and directly supported in the context of the three-dimensional printing kit, the method of three-dimensional printing, and vice versa.

Terms used herein will have the ordinary meaning in the relevant technical field unless specified otherwise. In some instances, there are terms defined more specifically throughout the specification or included at the end of the present specification, and thus, these terms can have a meaning as described herein.

Multi-Fluid Kits

In accordance with examples of the present disclosure, a multi-fluid kit 10 is shown in FIG. 1. The multi-fluid kit can include a wetting agent 100 and a binding agent 200. The wetting agent can include from about 5 wt % to about 80 wt % water-miscible hydroxyl-containing solvent 110 selected from methyl lactate, ethyl lactate, propyl lactate, 2-methyl 2,4-pentanediol, 1,2 hexanediol, 1,2 pentanediol, or a mixture thereof; and from about 20 wt % to about 95 wt % water 120. The binding agent can include from about 2 wt % to about 30 wt % of a polymer binder 210 dispersed in an aqueous liquid vehicle 220.

Three-Dimensional Printing Kits

Figure 2:
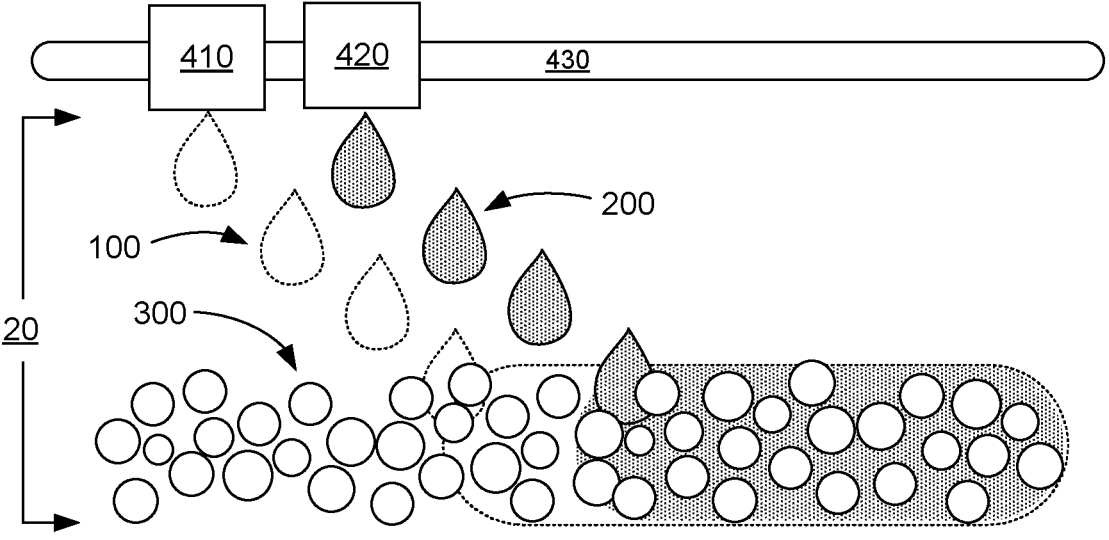
FIG. 2 graphically illustrates a three-dimensional printing kit in accordance with the present disclosure.

In accordance with other examples of the present disclosure, a three-dimensional printing kit 20 is shown in FIG. 2. The three-dimensional printing kit can include a wetting agent 100, a binding agent 200, and a particulate build material 300. In this example, a wetting agent can be applied using a wetting agent fluid ejector 410, and the binding agent is applied using a binding agent fluid ejector 420, both of which may be included on a carriage track 430 or other similar structure. It is noted, however, that there can be other application architecture alternatively used as described in greater detail herein. Furthermore, the particulate build material is supported in this example by a build platform, or more typically, by previously applied particulate build material layers, e.g., portions printed with a binding agent, portions printed with a wetting agent, and/or portions which may remain unprinted). In one example, the wetting agent can include from about 5 wt % to about 80 wt % water-miscible hydroxyl-containing solvent 110 selected from methyl lactate, ethyl lactate, propyl lactate, 2-methyl 2,4-pentanediol, 1,2 hexanediol, 1,2 pentanediol, or a mixture thereof; and from about 20 wt % to about 95 wt % water 120. The binding agent can include from about 2 wt % to about 30 wt % of a polymer binder 210 dispersed in an aqueous liquid vehicle 220. The particulate build material 300 can include from about 80 wt % to 100 wt % metal particles. The wetting agent, the binding agent, or both the wetting agent and the binding agent, may be packaged or co-packaged with the particulate build material in separate containers, and/or can be combined with the particulate build material at the time of printing.

Wetting Agents

In further reference to FIGS. 1 and 2 and in other examples herein, regarding the wetting agent 100 that may be present in the multi-fluid kit 10, the three-dimensional printing kit 20, or utilized in the method of three-dimensional printing as described herein, the wetting agent can include a water-miscible hydroxyl-containing solvent and water. The wetting agent can be used to wet a particulate build material prior to applying a binding agent. The wetting agent can act to minimize structural disruption of the particulate build material and can increase penetration of the binding agent into a layer of the particulate build material.

The wetting agent can include from about 5 wt % to about 80 wt % of water-miscible hydroxyl-containing solvent. In yet other examples, the wetting agent can include from about 10 wt % to about 80 wt %, from about 20 wt % to about 60 wt %, from about 50 wt % to about 80 wt %, from about 40 wt % to about 80 wt %, from about 20 wt % to about 40 wt % or from about 50 wt % to about 75 wt % of a water-miscible hydroxyl-containing solvent. The water-miscible hydroxyl-containing solvent can have a boiling point from about 120° C. to about 250° C. In yet other examples, the water-miscible hydroxyl-containing solvent can have a boiling point from about 150° C. to about 200° C., from about 125° C. to about 175° C., from about 150° C. to about 250° C., from about 120° C. to about 220° C., or from about 140° C. to about 250° C.

The water-miscible hydroxyl-containing solvent can exhibit a dipole moment. A dipole moment occurs when there is a separation of charge in a portion of a molecule or across a molecule of the solvent. The dipole moment of the water-miscible hydroxyl-containing solvent can range from about 1.5 μ/D (microns/debyes) to about 3.2 μ/D. In yet other examples, the water-miscible hydroxyl-containing solvent can range from about 1.8 μ/D to about 3.2 μ/D, from about 2.2 μ/D to about 3.2 μ/D, from about 2.4 μ/D to about 3.0 μ/D, from about 1.6 μ/D to about 2.6 μ/D, or from about 2.0 μ/D to about 3.0 μ/D.

A molar mass of the water-miscible hydroxyl containing solvent can range from about 100 g/mol to about 150 g/mol, in some examples. In yet other examples, the water-miscible hydroxyl containing solvent can have a molar mass ranging from about 100 g/mol to about 125 g/mol, from about 115 g/mol to about 130 g/mol, or from about 125 g/mol to about 150 g/mol. In some examples, the water-miscible hydroxyl containing solvent molecules can have a carbon to oxygen atom ratio from about 1:3 to about 3:5. In yet other examples, the water-miscible hydroxyl containing solvent can have a carbon to oxygen molar ratio from about 1:5 to about 3:5, or from about 1:3 to about 2:5.

In some examples, the water-miscible hydroxyl-containing solvent can be a symmetric molecule. In yet other examples, the water-miscible hydroxyl-containing solvent can be an asymmetric molecule. A water-miscible hydroxyl-containing solvent as used herein, can include both hydrophilic and hydrophobic segments. Due to the presence of hydrophilic and hydrophobic segments, the water-miscible hydroxyl-containing solvent can be an amphiphilic solvent. A structure of the water-miscible hydroxyl-containing solvent can wet easily and very quickly wet surfaces of a variable nature (both hydrophobic and hydrophilic) and can render them uniformly wettable at faster rates when subsequently wetted by water-based binder formulations.

In an example, the water-miscible hydroxyl-containing solvent can include a diol, oxy-ester, or a combination thereof. In an example, the water-miscible hydroxyl-containing solvent can include methyl lactate, ethyl lactate, propyl lactate, 2-methyl 2,4-pentanediol, 1,2 hexanediol, 1,2 pentanediol, or a mixture thereof. In another example, the water-miscible hydroxyl-containing solvent can include methyl lactate, ethyl lactate, propyl lactate, or a combination thereof. In yet another example, the water-miscible hydroxyl-containing solvent can include 1,2 hexanediol, 1,2 pentanediol, or a combination thereof. In a further example, the water-miscible hydroxyl-containing solvent can include 2-methyl, 2,4-pentanediol. In one example, the water-miscible hydroxyl-containing solvent can include ethyl lactate, 2-methyl 2,4-pentanediol, or a combination thereof.

The wetting agent can further include from about 20 wt % to about 90 wt % water. In other examples, the water can be present at from about 40 wt % to about 80 wt %, from about 20 wt % to about 80 wt %, from about 50 wt % to about 90 wt %, from about 25 wt % to about 75 wt %, from about 30 wt % to about 50 wt %, from about 30 wt % to about 60 wt %, from about 60 wt % to about 90 wt %, or from about 50 wt % to about 75 wt %. The water can be deionized, for example. The water can act as a propellant for the wetting agent.

In some examples, the wetting agent can further include a colorant. The colorant can include a pigment, a dye, or both a pigment and a dye. In some examples, there is no colorant present. However, in other examples, where a colorant is included, it may be included for the purpose of providing a visual clue or indicator that the wetting agent has been applied at a given location, or to provide an indicator or clue as to nozzle health. As the present disclosure is drawn to printing and then heat-fusing green body objects to form heat-fused metal objects, typically the colorant would burn off during sintering or annealing. Thus, small concentrations of colorant can be used, if at all. If included, the colorant can be present up to 5 wt %, for example. Example ranges may be from about 0.01 wt % to about 5 wt %, from about 0.1 wt % to about 4 wt %, from about 0.5 wt % to about 4 wt %, from about 1 wt % to about 4 wt %, from about 2 wt % to about 4 wt %, or from about 2 w % to about 4 wt %.

Binding Agents

In further reference to FIGS. 1 and 2, regarding the binding agent 200 that may be present in the multi-fluid kit 10 for three-dimensional printing, the three-dimensional printing kit 20, or utilized in the method of three-dimensional printing as described herein, the binding agent can include a polymer binder 210 and an aqueous liquid vehicle 220. The polymer binder can bind the particulate build material together during the build process to form a green body object. The term "binder" can include any material used to physically bind the particles of the particulate build material, e.g., metal particles, together or facilitate adhesion to a surface of adjacent particles in order to prepare a green part or green body object in preparation for subsequent heat-fusing, e.g., sintering, annealing, melting, etc. During three-dimensional printing, a binding agent can be applied to the particulate build material on a layer by layer basis. The aqueous liquid vehicle of the binding agent can be capable of wetting a particulate build material and the binder can move into vacant spaces between particles of the particulate build material, for example.

The binding agent can provide binding to the particulate build material upon application, or in some instances, can be activated after application to provide binding. The polymer binder can be activated or cured by heating the polymer binder (which may be accomplished by heating an entire layer of the particulate build material on at least a portion of the binding agent which has been selectively applied. The heating may occur at about the glass transition temperature of the polymer binder, for example. When activated or cured, the polymer binder can form a network that adheres or glues the particles of the particulate build material together, thus providing cohesiveness in forming and/or holding the shape of the green body object or a printed layer thereof. A "green" part or green body object or article (or individual layer) can refer to any component or mixture of components that are not yet sintered or annealed, but which are held together in a manner sufficient to permit heat-fusing, e.g., handling, moving, or otherwise preparing the part for heat-fusing.

Thus, in one example, the green body object can have the mechanical strength to withstand extraction from a powder bed and can then be sintered or annealed to form a heat-fused article. Once the green part or green body object is sintered or annealed, the article can sometimes be referred to as a "brown" article, but more typically herein as a "heat-fused" article, part, or object. The term "sinter" or "sintering" refers to the consolidation and physical bonding of the particles together (after temporary binding using the binding agent) by solid state diffusion bonding, partial melting of particles, or a combination of solid state diffusion bonding and partial melting. The term "anneal" or "annealing" refers to a heating and cooling sequence that controls the heating process and the cooling process, e.g., slowing cooling in some instances can remove internal stresses and/or toughen the heat-fused part or article (or "brown" part). In some examples, the polymer binder contained in the binding agent can undergo a pyrolysis or burnout process where the binder may be removed during sintering or annealing. This can occur where the thermal energy applied to a green body part or article removes inorganic or organic volatiles and/or other materials that may be present either by decomposition or by burning the binding agent.

The polymer binder can be included, as mentioned, in an aqueous liquid vehicle for application to the particulate build material. For example, the polymer binder can be present in the binding agent at from about 2 wt % to about 30 wt %, from about 2 wt % to about 20 wt %, from about 5 wt % to about 25 wt %, from about 10 wt % to about 20 wt %, from about 7.5 wt % to about 15 wt %, from about 15 wt % to about 30 wt %, from about 20 wt % to about 30 wt %, or from about 2 wt % to about 12 wt % in the binding agent.

In some examples, the polymer binder can be dispersible and/or dissolved in the aqueous liquid vehicle. In another example, the polymer binder can include polymer particles, such as latex polymer particles. The polymer particles can have an average particle size that can range from about 3 nm to about 1 μm. In other examples, the polymer particles can have an average particle size that can range from about 5 nm to about 700 nm, from about 20 nm to about 500 nm, from about 30 nm to about 400 nm, or from about 50 nm to about 350 nm.

In one example, the latex particles can include any of a number of copolymerized monomers, and may in some instances include a copolymerized surfactant, e.g., polyoxyethylene compound, polyoxyethylene alkylphenyl ether ammonium sulfate, sodium polyoxyethylene alkylether sulfuric ester, polyoxyethylene styrenated phenyl ether ammonium sulfate, etc. The copolymerized monomers can be from monomers, such as styrene, p-methyl styrene, α-methyl styrene, methacrylic acid, acrylic acid, acrylamide, methacrylamide, 2-hydroxyethyl acrylate, 2-hydroxyethyl methacrylate, 2-hydroxypropyl acrylate, 2-hydroxypropyl methacrylate, methyl methacrylate, hexyl acrylate, hexyl methacrylate, butyl acrylate, butyl methacrylate, ethyl acrylate, ethyl methacrylate, 2-ethylhexyl acrylate, 2-ethylhexyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, benzyl methacrylate, benzyl acrylate, ethoxylated nonyl phenol methacrylate, ethoxylated biphenyl methacrylate, polypropyleneglycol monoacrylate, isobornyl methacrylate, cyclohexyl methacrylate, cyclohexyl acrylate, t-butyl methacrylate, n-octyl methacrylate, lauryl methacrylate, tridecyl methacrylate, alkoxylated tetrahydrofurfuryl acrylate, isodecyl acrylate, isobornyl methacrylate, isobornyl acrylate, dimethyl maleate, dioctyl maleate, acetoacetoxyethyl methacrylate, diacetone acrylamide, N-vinyl imidazole, N-vinylcarbazole, N-vinyl-caprolactam, or combinations thereof. In some examples, the latex particles can include an acrylic. In other examples, the latex particles can include 2-phenoxyethyl methacrylate, cyclohexyl methacrylate, cyclohexyl acrylate, methacrylic acid, combinations thereof, derivatives thereof, or mixtures thereof. In another example, the latex particles can include styrene, methyl methacrylate, butyl acrylate, methacrylic acid, combinations thereof, derivatives thereof, or mixtures thereof.

With respect to the aqueous liquid vehicle, the binding agent can include from about 70 wt % to about 98 wt %, from about 80 wt % to about 98 wt %, from about 75 wt % to about 95 wt %, or from about 70 wt % to about 95 wt % aqueous liquid vehicle, based on the weight of the binding agent as a whole. In one example, the aqueous liquid vehicle can include water as a major solvent, e.g., the solvent present at the highest concentration when compared to other co-solvents. In another example, the aqueous liquid vehicle can further include from about 0.1 wt % to about 70 wt %, from about 0.1 wt % to about 50 wt %, or from about 1 wt % to about 30 wt % of liquid components other than water. The other liquid components can include organic co-solvent, surfactant, additive that inhibits growth of harmful microorganisms, viscosity modifier, pH adjuster, sequestering agent, preservatives, etc.

When present, organic co-solvent(s) can include high-boiling solvents and/or humectants, e.g., aliphatic alcohols, aromatic alcohols, alkyl diols, glycol ethers, polyglycol ethers, 2-pyrrolidinones, caprolactams, formamides, acetamides, C6 to C24 aliphatic alcohols, e.g. fatty alcohols of medium (C6-C12) to long (C13-C24) chain length, or mixtures thereof. The organic co-solvent(s) in aggregate can be present from 0 wt % to about 50 wt % in the binding agent. In other examples, organic co-solvents can be present at from about 5 wt % to about 25 wt %, from about 2 wt % to about 20 wt %, or from about 10 wt % to about 30 wt % in the binding agent.

Particulate Build Materials

In further reference to FIG. 2, the particulate build material 300 can include from about 80 wt % to 100 wt % metal particles based on a total weight of the particulate build material. In yet other examples, the metal particles can be present in the particulate build material at from about 90 wt % to 100 wt %, from about 95 wt % to 100 wt %, from about 80 wt % to about 90 wt %, or from about 85 wt % to about 95 wt %. The metal particles can be selected from steels, stainless steels, other ferrous alloys, bronzes, titanium, titanium alloys, aluminum, aluminum alloys, nickel, nickel alloys, cobalt, cobalt alloys, iron, iron alloys, nickel cobalt alloys, gold, gold alloys, silver, silver alloys, platinum, platinum alloys copper, copper alloys, niobium alloys, etc. Metals included in the alloys can be any of the metals listed above, and/or may likewise include chromium, vanadium, tungsten, tungsten (tungsten carbide), tantalum, molybdenum, magnesium, etc., or even nonmetals or metalloids, such as silicon, boron, germanium, etc.

In an example, the metal particles can be a single phase metallic material composed of one element. In this example, the sintering temperature may be below the melting point of the single element. In another example, the metal particles can be composed of two or more elements, which may be in the form of a single phase metallic alloy or a multiple phase metallic alloy. In these other examples, sintering generally can occur over a range of temperatures. With respect to alloys, materials with a metal alloyed to a non-metal (such as a metal-metalloid alloy) can be used as well.

The temperature(s) at which the metallic particles of the particulate build material sinter can be above the temperature of the environment in which patterning (with the binding agent) is performed (e.g., patterning at from about 1° C. to about 100° C.). In some examples, the metal particles may be sintered at from about 500° C. to about 3,500° C., depending on the material. Other temperature ranges that can be used, depending on the particulate build material metal chosen or formulated for use, can be from about 800° C. to about 2,500° C., from about 1,000° C. to about 1,800° C., or from about 1,200° C. to about 1,600° C. For example, stainless steel alloys may be sinterable from about 1,100° C. to about 1,500° C., whereas copper alloys may be sinterable at a considerable lower temperature, e.g., from about 750° C. to about 1,000° C.

If ceramic particles are present in the particulate build material, the ceramic material may be selected from metal oxides, inorganic glasses, carbides, nitrides, borides, and the like. In an example, the ceramic particles can include alumina glass, soda-lime glass, borosilicate glass, alumina silica glass, silicon mononitride, silicon dioxide, zirconia, titanium dioxide, magnesium aluminate, tin oxide, yttrium oxide, hafnium oxide, tantalum oxide, scandium oxide, niobium oxide, vanadium oxide, or a combination thereof. A temperature at which the ceramic particles, if present, of the particulate build material can sinter can also be above the temperature of the environment in which patterning (with the binding agent) is performed. For example, a ceramic such as alumina, may be sinterable at higher temperatures starting at about 1,400° C. but may be a higher or lower temperature depending on material particle size, for example. Again, this depends on the specific material chosen.

The particles of the particulate build material can have a D50 particle size from about 3 μm to about 100 μm. Metal particles can have a D50 particle size that can range from about 3 μm to about 90 μm, from about 10 μm to about 100 μm, from about 20 μm to about 80 μm, from about 30 μm to about 50 μm, from about 25 μm to about 75 μm, from about 40 μm to about 80 μm, from about 50 μm to about 75 μm, from about 5 μm to about 60 μm, from about 60 μm to about 90 μm, or from about 15 μm to about 85 μm, for example. Ceramic particles can have a D50 particle size that can range from about 0.1 μm to about 50 μm, from about 0.1 μm to about 10 μm, from about 0.1 μm to about 1 μm, from about 0.5 μm to about 25 μm, from about 0.1 μm to about 5 μm, from about 0.5 μm to about 3 μm, from about 0.1 μm to about 2 μm, or from about 0.1 μm to about 1 μm. As used herein, particle size can refer to a value of the diameter of spherical particles or in particles that are not spherical can refer to the equivalent spherical diameter of that particle.

The particle size can be presented as a Gaussian distribution or a Gaussian-like distribution (or normal or normal-like distribution). Gaussian-like distributions are distribution curves that can appear Gaussian in distribution curve shape, but which can be slightly skewed in one direction or the other (toward the smaller end or toward the larger end of the particle size distribution range). That being stated, an example Gaussian-like distribution of the particles can be characterized generally using "D10," "D50," and "D90" particle size distribution values, where D10 refers to the particle size at the 10th percentile, D50 refers to the particle size at the 50th percentile, and D90 refers to the particle size at the 90th percentile. For example, a D50 value of about 25 μm means that about 50% of the particles (by number) have a particle size greater than about 25 μm and about 50% of the particles have a particle size less than about 25 μm. Particle size distribution values are not necessarily related to Gaussian distribution curves. In practice, true Gaussian distributions are not typically present, as some skewing can be present, but still, the Gaussian-like distribution can be considered to be "Gaussian" as used in practice. Particle size distribution can be expressed in terms of D50 particle size, which can approximate average particle size, but may not be the same. In examples herein, the particle size ranges can be modified to "average particle size," providing sometimes slightly different size distribution ranges.

A shape of the particles can be spherical, irregular spherical, rounded, semi-rounded, discoidal, angular, subangular, cubic, cylindrical, or any combination thereof. In one example, the particles can include spherical particles, irregular spherical particles, or rounded particles. In some examples, the shape of the particles can be uniform or substantially uniform, which can allow for relatively uniform melting or sintering of the particles.

Three-Dimensional Printing Methods

A flow diagram of an example method of three-dimensional printing 500 is shown in FIG. 3. It is noted that the multi-fluid kit and/or the three-dimensional printing kit used can be as described in either of the examples set forth in FIGS. 1 and 2, for example. The method can include iteratively applying 510 individual build material layers of a particulate build material onto a powder bed. The particulate build material can include from about 80 wt % to 100 wt % metal particles. The method can further include, based on a three-dimensional object model, iteratively and selectively applying 520 a wetting agent to individual build material layers. The wetting agent can include from about 5 wt % to about 80 wt % water-miscible hydroxyl-containing solvent and from about 20 wt % to about 95 wt % water. The water-miscible hydroxyl-containing solvent can be selected from methyl lactate, ethyl lactate, propyl lactate, 2-methyl 2,4-pentanediol, 1,2 hexanediol, 1,2 pentanediol, or a mixture thereof. The method can further include, based on a three-dimensional object model, iteratively and selectively applying 530 a binding agent to individual build material layers at a location where the wetting agent was applied to define individually patterned object layers that become adhered to one another to form a layered green body object. The binding agent can include from about 2 wt % to about 30 wt % of a polymer binder and an aqueous liquid vehicle.

In some examples, the particulate build material can be heated prior to application of the wetting agent and/or the binding agent. For example, heat can be applied to the build platform, or from any other direction or time, to bring the particulate build material to a temperature near its fusing temperature, making it easier to bring up a temperature enough to generate fusion of the polymeric build material.

For example, heat may be applied to the particulate build material in the powder bed from the build platform, from above, or to the particulate build material prior to being spread on the powder bed to preheat the particulate build material within about 10° C. to about 70° C. of a fusing temperature of the polymeric build material. Preheating can permit less energy to be applied to bring the particulate build material particles to their fusing temperature.

The wetting agent and the binding agent can be applied at a location of the particulate build material at a weight ratio of from about 1:5 to about 5:1. In yet another example the wetting agent and the binding agent can be applied at a location of the particulate build material at a weight ratio of from about 1:3 to about 3:1. Controlling a weight ratio of the wetting agent and the binding agent can ensure that enough wetting agent can be applied to increase penetration of the binding agent through a layer of the particulate build material and can allow the binding agent to be applied in an amount that permits binding of the particulate build material without exceeding a fluid capacity of the particulate build material.

In some examples, a total fluid agent (wetting agent and the binding agent collectively) can be applied at a location of the particulate build material at a weight ratio from about 3:97 to about 10:90. In yet other examples the total fluid agent can be applied at a location of the particulate build material at a total weight ratio of from about 5:80 to about 10:90 or from about 3:45 to about 10:90. These weight ratios can ensure that a fluid capacity of the particulate build material is not exceeded.

After an individual particulate build material layer is printed thereon with the wetting agent and the binding agent, in some instances the individual build material layer or the layered green body object can be heated to drive off water and/or other liquid components, as well as to further solidify the layer of the three-dimensional green body object. The heat can be applied from overhead and/or can be provided by a build platform from beneath the particulate build material. In one example, the heating of the individual build material layer or the layered green body object can occur at a temperature ranging from about 100° C. to about 200° C. to cure the individual build material layer or the layered green body object.

During printing, the build platform can be dropped a distance that corresponds to a thickness of particulate build material that is spread for the next layer of the green body object or article to be formed, so that another layer of the particulate build material can be added thereon, printed with wetting agent, binding agent, heated, etc. This process can be repeated on a layer by layer basis until the green body object is formed.

Following the formation of the green body object, in one example, the entire green body object can be moved to an oven and fused by sintering and/or annealing. The method can include heating the green body object to a debinding temperature (ranging from about 300° C. to about 550° C.) in order to remove polymer binder via pyrolysis and then heating the green body object to a sintering temperature (which is below melting temperature of the particulate build material) ranging from about 600° C. to about 3,500° C. During sintering the build material particles can consolidate into the final part. Sintering the green body object can include heating the green body object to a temperature ranging from about 600° C. to about 3,500° C. to fuse individual particles of the particulate build material together and form a heat-fused three-dimensional article. In some examples, the temperature can range from about 1,200° C.

to about 1,400° C., from about 1,000° C. to about 3,000° C., or from about 600° C. to about 2,000° C. In one example, the heat-fused three-dimensional article can have a porosity that can range from about 0.1 vol % to about 60 vol % or from about 0.1 vol % to about 40 vol %.

Definitions

It is noted that, as used in this specification and the appended claims, the singular forms "a," "an," and "the" include plural referents unless the content clearly dictates otherwise.

The term "about" as used herein, when referring to a numerical value or range, allows for a degree of variability in the value or range, for example, within 10%, or, in one aspect within 5%, of a stated value or of a stated limit of a range. The term "about" when modifying a numerical range is also understood to include as one numerical subrange a range defined by the exact numerical value indicated, e.g., the range of about 1 wt % to about 5 wt % includes 1 wt % to 5 wt % as an explicitly supported sub-range. As used herein, "kit" can be synonymous with and understood to include a plurality of compositions including multiple components where the different compositions can be separately contained in the same or multiple containers prior to and during use, e.g., building a three-dimensional object, but these components can be combined together during a build process. The containers can be any type of a vessel, box, or receptacle made of any material.

As used herein, "green" describes any of a number of intermediate structures prior to any particle to particle material fusing, e.g., green part, green body, green body object, green body layer, etc. As a "green" structure, the particulate build material can be (weakly) bound together by a binder. Typically, a mechanical strength of the green body is such that the green body can be handled or extracted from a particulate build material on a build platform to place in an oven, for example. It is to be understood that any particulate build material that is not patterned with the binding agent is not considered to be part of the "green" structure, even if the particulate build material is adjacent to or surrounds the green body object or layer thereof. For example, unprinted particulate build material can act to support the green body while contained therein, but the particulate build material is not part of the green structure unless the particulate build material is printed with a binding agent to generate a solidified part prior to fusing, e.g., sintering, annealing, melting, etc.

The term "fuse," "fusing," "fusion," "heat-fused" or the like refers to the joining of the material of adjacent particles of a particulate build material, such as by sintering, annealing, melting, or the like, and can include a complete fusing of adjacent particles into a common structure, e.g., melting together, or can include surface fusing where particles are not fully melted to a point of liquefaction, but which allow for individual particles of the particulate build material to become bound to one another, e.g., forming material bridges between particles at or near a point of contact.

As used herein, the terms three-dimensional "part," "object," "article," or the like, refer to the target object that is being built, typically in two phases, e.g., formation of a green body object followed by heat fusion of the green body object to form a heat-fused article. The three-dimensional object after heating to a sintering or anneal temperature sufficient for metal and/or ceramic inter-particle fusion can be referred to as a "heat-fused" article, indicating that the object has been fused together into a sturdy and rigid part, such as by sintering, annealing, melting, etc. On the other hand, the term "green body" or "green" when referring to the object, part, or article indicates that the three-dimensional object has been solidified, but not yet heat-fused.

As used herein, "applying" when referring to a binding agent or other fluid agents that may be used, for example, refers to any technology that can be used to put or place the fluid agent, e.g., binding agent, on the particulate build material or into a layer of particulate build material for forming a three-dimensional green body object. For example, "applying" may refer to "jetting," "ejecting," "dropping," "spraying," or the like.

As used herein, "jetting" or "ejecting" refers to fluid agents or other compositions that are expelled from ejection or jetting architecture, such as ink-jet architecture. Ink-jet architecture can include thermal or piezoelectric architecture. Additionally, such architecture can be configured to print varying drop sizes such as from about 3 picoliters to less than about 10 picoliters, or to less than about 20 picoliters, or to less than about 30 picoliters, or to less than about 50 picoliters, etc.

As used herein, a plurality of items, structural elements, compositional elements, and/or materials may be presented in a common list for convenience. However, these lists should be construed as though the individual member of the list is identified as a separate and unique member. Thus, no individual member of such list should be construed as a de facto equivalent of any other member of the same list based on presentation in a common group without indications to the contrary.

Concentrations, dimensions, amounts, and other numerical data may be presented herein in a range format. It is to be understood that such range format is used merely for convenience and brevity and should be interpreted flexibly to include the numerical values explicitly recited as the limits of the range, as well as to include all the individual numerical values or sub-ranges encompassed within that range as the individual numerical value and/or sub-range is explicitly recited. For example, a weight ratio range of about 1 wt % to about 20 wt % should be interpreted to include the explicitly recited limits of 1 wt % and 20 wt % and to include individual weights such as about 2 wt %, about 11 wt %, about 14 wt %, and sub-ranges such as about 10 wt % to about 20 wt %, about 5 wt % to about 15 wt %, etc.

EXAMPLES

The following illustrates examples of the present disclosure. However, it is to be understood that the following is only illustrative of the application of the principles of the present disclosure. Numerous modifications and alternative multi-fluid kits, three-dimensional printing kits, compositions, methods, systems, etc., may be devised without departing from the spirit and scope of the present disclosure. The appended claims are intended to cover such modifications and arrangements.

Example 1—Wetting Agent Formulations

Two wetting agents (W1 and W2) were prepared by admixing a water-miscible hydroxyl-containing solvent and water as indicated in Table 1 below.

TABLE 1

| Wetting Agent Formulations | | | |
| --- | --- | --- | --- |
| Component | Ingredient Type | W1 | W2 |
| Ethyl lactate | water-miscible hydroxyl-containing solvent | 60 wt % | — |
| 2-methyl 2,4-pentanediol | water-miscible hydroxyl-containing solvent | — | 60 wt % |
| Water | solvent | 40 wt % | 40 wt % |

Example 2—Binding Agent Formulation

A binding agent (B1) was prepared in accordance with Table 2 below.

TABLE 2

| Binding Agent Formulation | | |
| --- | --- | --- |
| Component | Component Type | Weight % |
| Proprietary acrylic latex (per dry polymer weight) | Binder | 12 |
| 1,2-Butanediol | Co-Solvent | 26 |
| Tergitol ® 15-S7 | Surfactant | 1 |
| Water | Solvent | Balance |

TERGITOL ® 15-S7 is commercially available from The Dow Chemical Company (USA).

Example 3—Wetting Agent and Binding Agent Application on a Particulate Build Material The wetting agents of Table 1 and the binding agent of Table 2 were printed sequentially on a 50 μm thick layer of stainless steel 316L powder having an average particle size of 22 μm. The wetting agents were applied (individually in separate examples) at a total fluid weight ratio (wetting agent and the binding agent) to particulate build material of from about 1:5 to about 5:1. Thus, the binding agent (B1) was printed on the particulate build material directly over where the respective wetting agents (W1 or W2) were applied. The particulate build material was visually inspected following the application of the various fluid agent. For comparison, a layer of the particulate build material was with the binding agent (excluding the wetting agent). It was noted that the particulate build material printed without wetting agent appeared darker than the layer printed on with either of the wetting agents (prior to binding agent application). On the other hand, the particulate build material with both wetting agent and binding agent printed thereon appeared lighter in color, which correlated to a smoother patterned powder surface with a lack of erratic uneven wetting interactions.

Example 4—Effect on Green Body Object Strength

Several green body objects prepared in accordance with Example 3 and having dimensions of 38.16 mm×15.24 mm×7.62 mm were compared for strength (e.g., prior to heat fusion). Some samples included only the particulate build material and the binding agent (B1), and some of the samples included both wetting agent (W1) and binding agent (B1) applied to the particulate build material. Peak stress values were determined in a MTS C42 load frame tester. Three green body objects formed from application of both the wetting agent and the binding agent had a peak stress of 5.2 MPa, 6.0 MPa, and 6.2 MPa. Three green body objects formed from application of binding agent without application the wetting agent had a peak stress of 2.2 MPa, 2.7 MPa, and 2.8 Mpa. The relatively significant differences in peak stress indicated that applying the wetting agent prior to the binding agent during three-dimensional printing increased the overall strength of the printed green body objects, making the green body object formed more robust for handling and transferring to the fusing or sintering oven.

What is claimed is:

1. A multi-fluid kit for three-dimensional printing, the multi-fluid kit comprising:
   a wetting agent including:
      from about 5 wt % to about 80 wt % of a water-miscible hydroxyl-containing solvent selected from the group consisting of methyl lactate, ethyl lactate, propyl lactate, and a mixture thereof; and
      from about 20 wt % to about 95 wt % of water; and
   a binding agent including from about 2 wt % to about 30 wt % of a polymer binder and an aqueous liquid vehicle.

2. The multi-fluid kit of claim 1, wherein the wetting agent includes from about 20 wt % to about 60 wt % of the water-miscible hydroxyl-containing solvent.

3. The multi-fluid kit of claim 1, wherein the water-miscible hydroxyl-containing solvent is ethyl lactate.

4. The multi-fluid kit of claim 1, wherein the polymer binder includes latex polymer particles having an average particle size of from about 3 nm to about 1 μm.

5. The multi-fluid kit of claim 1, wherein the wetting agent includes from 60 wt % to about 80 wt % of the water-miscible hydroxyl-containing solvent.

6. The multi-fluid kit of claim 1, wherein the wetting agent consists of the water-miscible hydroxyl-containing solvent and the water.

7. The multi-fluid kit of claim 1, wherein the polymer binder is a latex polymer binder including copolymerized monomers, wherein the monomers are selected from the group consisting of styrene, p-methyl styrene, α-methyl styrene, methacrylic acid, acrylic acid, acrylamide, methacrylamide, 2-hydroxyethyl acrylate, 2-hydroxyethyl methacrylate, 2-hydroxypropyl acrylate, 2-hydroxypropyl methacrylate, methyl methacrylate, hexyl acrylate, hexyl methacrylate, butyl acrylate, butyl methacrylate, ethyl acrylate, ethyl methacrylate, 2-ethylhexyl acrylate, 2-ethylhexyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, benzyl methacrylate, benzyl acrylate, ethoxylated nonyl phenol methacrylate, ethoxylated biphenyl methacrylate, polypropyleneglycol monoacrylate, isobornyl methacrylate, cyclohexyl methacrylate, cyclohexyl acrylate, t-butyl methacrylate, n-octyl methacrylate, lauryl methacrylate, tridecyl methacrylate, alkoxylated tetrahydrofurfuryl acrylate, isodecyl acrylate, isobornyl methacrylate, isobornyl acrylate, dimethyl maleate, dioctyl maleate, acetoacetoxyethyl methacrylate, diacetone acrylamide, N-vinyl imidazole, N-vinylcarbazole, N-vinyl-caprolactam, and combinations thereof.

8. The multi-fluid kit of claim 1, wherein the aqueous liquid vehicle of the binding agent includes water and a co-solvent, and wherein the co-solvent is 1,2-butanediol.

9. A three-dimensional printing kit, comprising:
   a wetting agent including:
      from about 5 wt % to about 80 wt % of a water-miscible hydroxyl-containing solvent selected from the group consisting of methyl lactate, ethyl lactate, propyl lactate, and a mixture thereof; and from about 20 wt % to about 95 wt % of water;

a binding agent including from about 2 wt % to about 30 wt % of a polymer binder and an aqueous liquid vehicle; and a particulate build material including from about 80 wt % to 100 wt % of metal particles.

10. The three-dimensional printing kit of claim 9, wherein the wetting agent includes from about 20 wt % to about 60 wt % of the water-miscible hydroxyl-containing solvent.

11. The three-dimensional printing kit of claim 9, wherein the particulate build material includes from about 95 wt % to 100 wt % of the metal particles, and the metal particles have D50 particle size of from about 3 μm to about 100 μm.

12. The three-dimensional printing kit of claim 9, wherein the water-miscible hydroxyl-containing solvent is ethyl lactate.

13. A method of three-dimensional printing, the method comprising:

iteratively applying individual build material layers of a particulate build material onto a powder bed, the particulate build material including from about 80 wt % to 100 wt % of metal particles;

based on a three-dimensional object model, iteratively applying a wetting agent to the individual build material layers, wherein the wetting agent includes:

from about 5 wt % to about 80 wt % of a water-miscible hydroxyl-containing solvent selected from the group consisting of methyl lactate, ethyl lactate, propyl lactate, and a mixture thereof; and from about 20 wt % to about 95 wt % of water; and based on the three-dimensional object model, iteratively and selectively applying a binding agent to the individual build material layers at a location where the wetting agent is applied to define individually patterned object layers that become adhered to one another to form a layered green body object, wherein the binding agent includes from about 2 wt % to about 30 wt % of a polymer binder and an aqueous liquid vehicle.

14. The method of claim 13, further comprising heating the layered green body object to a temperature ranging from about 100° C. to about 200° C. to cure the layered green body object.

15. The method of claim 13, wherein the wetting agent includes from about 20 wt % to about 60 wt % of the water-miscible hydroxyl-containing solvent, and the water-miscible hydroxyl-containing solvent is ethyl lactate.

16. The method of claim 13, wherein the wetting agent and the binding agent are applied at the location at a weight ratio of from about 1:5 to about 5:1.

17. The method of claim 13, wherein the wetting agent and the binding agent are collectively applied as a total fluid agent at the location at a total fluid agent to particulate build material weight ratio of from about 3:97 to about 10:90.

18. The method of claim 13, further comprising heating the particulate build material to a temperature ranging from about 40° C. to about 100° C. during the iteratively applying of the wetting agent and the iteratively applying of the binding to the individual build material layers.

19. The method of claim 13, further comprising sintering the layered green body object to form a heat-fused metal article.

* * * * *